(12) United States Patent
Naughton et al.

(10) Patent No.: US 12,734,697 B2
(45) Date of Patent: Sep. 15, 2026

(54) TELEOPERATED FINGER GAITING SKILL VIA GAUSSIAN PROCESS RESIDUAL LEARNING

(71) Applicant: Honda Motor Co., Ltd., Tokyo (JP)

(72) Inventors: Patrick Naughton, Champaign, IL (US); Jinda Cui, San Jose, CA (US); Karankumar Patel, San Jose, CA (US); Soshi Iba, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 18/896,397

(22) Filed: Sep. 25, 2024

(65) Prior Publication Data

US 2025/0367831 A1 Dec. 4, 2025

Related U.S. Application Data

(60) Provisional application No. 63/654,836, filed on May 31, 2024.

(51) Int. Cl.
*B25J 9/16* (2006.01)
*B25J 15/10* (2006.01)

(52) U.S. Cl.
CPC ............. *B25J 9/1692* (2013.01); *B25J 9/163* (2013.01); *B25J 9/1689* (2013.01); *B25J 15/10* (2013.01)

(58) Field of Classification Search
CPC ........ B25J 15/0009; B25J 15/10; B25J 9/163; B25J 9/1689; B25J 9/1692
See application file for complete search history.

(56) References Cited

U.S. PATENT DOCUMENTS

| | | | | |
|---|---|---|---|---|
| 9,321,176 | B1 * | 4/2016 | Sun | B25J 15/0028 |
| 10,981,272 | B1 * | 4/2021 | Nagarajan | B25J 9/1669 |
| 2021/0125052 | A1 * | 4/2021 | Tremblay | G06N 3/084 |
| 2021/0293643 | A1 * | 9/2021 | Correll | A61F 2/54 |
| 2024/0066695 | A1 * | 2/2024 | Power | B25J 9/1612 |
| 2024/0075617 | A1 * | 3/2024 | Wu | B25J 9/1664 |
| 2025/0249585 | A1 * | 8/2025 | Rozo | B25J 9/1607 |
| 2026/0021578 | A1 * | 1/2026 | Iyer | B25J 9/163 |

OTHER PUBLICATIONS

Vincent Mahyert, Qian Feng, Jun Deng, Yunlei Shi, Zhaopeng Chen, Alois Knoll; FFHNet: Generating Multi-Fingered Robotic Grasps for Unknown Objects in Real-time; May 23, 2022; International Conference on Robotics and Automation, pp. 762-769 (Year: 2022).*

(Continued)

*Primary Examiner* — Wade Miles
*Assistant Examiner* — Zachary Joseph Wallace
(74) *Attorney, Agent, or Firm* — Weiss & Moy, PC; Jeffrey D. Moy

(57) ABSTRACT

A method for retargeting a motion of a hand to a multi-fingered robot hand may determine a residual between an optimization-based retargeting method and a labeled configuration of the multi-fingered robot hand using a predefined set of hand-labeled calibration poses. The method for retargeting may use an optimization-based assistive function for active fingers of the multi-fingered robot hand to maintain contact against an object during teleoperation with the multi-fingered robot hand.

20 Claims, 7 Drawing Sheets

Cube-Rot-H Cube-Rot-V Palm-to-Quadpod Card Pickup Wrench Pickup Controlled Pivot

(56) References Cited

OTHER PUBLICATIONS

Chunmiao Yu, Peng Wang; Dexterous Manipulation for Multi-Fingered Robotic Hands with Reinforcement Learning: A Review; Apr. 25, 2022; Frontiers in Neurobotics, vol. 16, pp. 1-17 (Year: 2022).*

Normal Marlier, Olivier Bruls, Gilles Louppe; Simulation Based Bayesian Inference for Multi-Fingered Robotic Grasping; Sep. 29, 2021 (Year: 2021).*

A. Sivakumar, K. Shaw, and D. Pathak. Robotic Telekinesis: Learning a Robotic Hand Imitator byWatching Humans on Youtube. New York City, NY, USA, Jul. 2022. Robotics Science and Systems. URL https://www.roboticsproceedings.org/rss18/p023.pdf.

Y. Qin, H. Su, and X.Wang. From one hand to multiple hands: Imitation learning for dexterous manipulation from single-camera teleoperation. IEEE Robotics and Automation Letters, 7(4): 10873-10881, 2022.

S. P. Arunachalam, S. Silwal, B. Evans, and L. Pinto. Dexterous Imitation Made Easy: A Learning-Based Framework for Efficient Dexterous Manipulation. In 2023 IEEE International Conference on Robotics and Automation (ICRA), pp. 5954-5961, London, United Kingdom, May 2023. IEEE. ISBN 9798350323658. doi:10.1109/ICRA48891.2023.10160275. URL https://ieeexplore.ieee.org/document/10160275/.

S. P. Arunachalam, I. Guzey, S. Chintala, and L. Pinto. Holo-Dex: Teaching Dexterity with Immersive Mixed Reality. In 2023 IEEE International Conference on Robotics and Automation (ICRA), pp. 5962-5969, London, United Kingdom, May 2023. IEEE. ISBN 9798350323658. doi:10.1109/ICRA48891.2023.10160547. URL https://ieeexplore. ieee.org/document/10160547/.

A. Handa, K. Van Wyk, W. Yang, J. Liang, Y.-W. Chao, Q. Wan, S. Birchfield, N. Ratliff, and D. Fox. DexPilot: Vision Based Teleoperation of Dexterous Robotic Hand-Arm System, Oct. 2019. URL http://arxiv.org/abs/1910.03135. 3.

R. Li, H. Wang, and Z. Liu. Survey on mapping human hand motion to robotic hands for teleoperation. IEEE Transactions on Circuits and Systems for Video Technology, 32(5):2647-2665, 2021.

R. Meattini, R. Suarez, G. Palli, and C. Melchiorri. Human to robot hand motion mapping methods: Review and classification. IEEE Transactions on Robotics, 39(2):842-861, 2022.

T. Mouri and H. Kawasaki. A novel anthropomorphic robot hand and its master slave system. Humanoid Robots, Human-Like Machines, pp. 29-42, 2007.

H. Liu, X. Xie, M. Millar, M. Edmonds, F. Gao, Y. Zhu, V. J. Santos, B. Rothrock, and S.-C. Zhu. A glove-based system for studying hand-object manipulation via joint pose and force sensing. In 2017 IEEE/RSJ International Conference on Intelligent Robots and Systems (IROS), pp. 6617-6624. IEEE, 2017.

Y. Saitou, F. Kobayashi, F. Kojima, H. Nakamoto, N. Imamura, K. Sasabe, and H. Shirasawa. Haptic feedback in universal robot hand tele-operation. In SCIS & ISIS SCIS & ISIS 2008, pp. 1123-1128. Japan Society for Fuzzy Theory and Intelligent Informatics, 2008.

Y. Qin,W. Yang, B. Huang, K. VanWyk, H. Su, X.Wang, Y.-W. Chao, and D. Fox. AnyTeleop: A General Vision-Based Dexterous Robot Arm-Hand Teleoperation System, Aug. 2023. URLhttp://arxiv.org/abs/2307.04577.

J. M. Correia Marques, P. Naughton, J.-C. Peng, Y. Zhu, J. S. Nam, Q. Kong, X. Zhang, A. Penmetcha, R. Ji, N. Fu, V. Ravibaskar, R. Yan, N. Malhotra, and K. Hauser. Immersive Commodity Telepresence with the AVATRINA Robot Avatar. International Journal of Social Robotics, Jan. 2024. ISSN 1875-4791, 1875-4805. doi:10.1007/s12369-023-01090-1. URL https://link.springer.com/10.1007/s12369-023-01090-1.

C. E. Rasmussen and C. K. I. Williams. Gaussian processes for machine learning. Adaptive computation and machine learning. MIT Press, Cambridge, Mass, 2006. ISBN 978-0-262-18253-9. OCLC: ocm61285753.

Y. Zhou, C. Barnes, J. Lu, J. Yang, and H. Li. On the continuity of rotation representations in neural networks. In Proceedings of the IEEE/CVF conference on computer vision and pattern recognition, pp. 5745-5753, 2019.

E. V. Bonilla, K. Chai, and C. Williams. Multi-task Gaussian Process Prediction. In Advances in Neural Information Processing Systems, vol. 20. Curran Associates, Inc., 2007. URL https://papers.nips.cc/paper_files/paper/2007/hash/66368270ffd51418ec58bd793f2d9b1b-Abstract.html.

J. Ansel, E. Yang, H. He, N. Gimelshein, A. Jain, M. Voznesensky, B. Bao, P. Bell, D. Berard, E. Burovski, G. Chauhan, A. Chourdia, W. Constable, A. Desmaison, Z. DeVito, E. Ellison, W. Feng, J. Gong, M. Gschwind, B. Hirsh, S. Huang, K. Kalambarkar, L. Kirsch, M. Lazos, M. Lezcano, Y. Liang, J. Liang, Y. Lu, C. Luk, B. Maher, Y. Pan, C. Puhrsch, M. Reso, M. Saroufim, M. Y. Siraichi, H. Suk, M. Suo, P. Tillet, E. Wang, X. Wang, W. Wen, S. Zhang, X. Zhao, K. Zhou, R. Zou, A. Mathews, G. Chanan, P. Wu, and S. Chintala. Py-Torch 2: Faster Machine Learning.

J. R. Gardner, G. Pleiss, D. Bindel, K. Q. Weinberger, and A. G. Wilson. Gpytorch: Blackbox matrix-matrix gaussian process inference with gpu acceleration. In Advances in Neural Information Processing Systems, 2018.

D. P. Kingma and J. Ba. Adam: A Method for Stochastic Optimization. arXiv:1412.6980 [cs], Jan. 2017. URL http://arxiv.org/abs/1412.6980.

S. G. Johnson. The NLopt nonlinear-optimization package. https://github.com/stevengj/nlopt, 2007.

D. Kraft. Algorithm 733: TOMP-fortran modules for optimal control calculations. ACM Transactions on Mathematical Software, 20:262-281, 1994. doi:10.1145/192115.192124.

S. Zhong, T. Power, A. Gupta, and P. Mitrano. PyTorch Kinematics, Feb. 2024.

* cited by examiner

TELEOPERATED FINGER GAITING SKILL VIA GAUSSIAN PROCESS RESIDUAL LEARNING

RELATED APPLICATIONS

This patent application is related to U.S. Provisional Application No. 63/654,836 filed May 31, 2024, entitled "TELEOPERATED FINGER GAITING SKILL VIA GAUSSIAN PROCESS RESIDUAL LEARNING", in the names of the same inventors and which is incorporated herein by reference in its entirety. The present patent application claims the benefit under 35 U.S.C § 119(e) of the aforementioned provisional application.

BACKGROUND

Teleoperated dexterous manipulation may have the potential to enable the long-range transfer of human manipulation skills to remote environments and may serve as a mass data collection mechanism to enable fully autonomous manipulation. Fluid manipulation using a multi-fingered robot hand may be difficult even with a human operator in the loop since it may require precise control of the many degrees of freedom (DoFs) of the hand simultaneously to coordinate finger motion and achieve a given task. In particular, finger-gaited manipulation, where a subset of fingers may be used to maintain a desired contact state while other fingers may be moved to change their contact state with the object to move it, may be challenging since the motion of the target object may be sensitive to the locations and modes of contacts. Specifically, during finger gaiting, the robot may need to contact different parts of the object and transition the contacts while maintaining force closure to bring the object into the target state. Such challenges may be further exacerbated by practical constraints such as the lack of haptic feedback and the kinematic mismatch between the human and robot hands.

Existing approaches for teleoperation of dexterous hands typically design a retargeter which may map the operator's hand configuration to the robot's desired configuration. Current literature tends to focus on evaluating these retargeters by how well they allow the robot hand to match the shape of the operator's hand visually, or to achieve grasping and non-prehensile pushing tasks. A few existing works have attempted basic teleoperated in-hand manipulation but may require specially designed task spaces for the tasks under consideration and provide no details about the reliability or efficiency of the methods. Presently, there may be one method that has demonstrated teleoperated finger gaiting with a multi-fingered hand. However, this method may have been able to achieve just a single finger gaiting task (in-hand block rotation).

A teleoperation system may benefit from the perceptual robustness and adaptability of the human operator and provide necessary assistance for system-level limitations such as reduced sensory feedback and physical mismatch. One may see two sub-issues in present finger gaiting teleoperation: 1) making contacts using free fingers at various desired locations on the object and 2) moving fingers that may be in contact with the object without losing the controllability over the object.

Limitations and disadvantages of conventional and traditional approaches will become apparent to one of skill in the art, through comparison of described method with some aspects of the present disclosure, as set forth in the remainder of the present application and with reference to the drawings.

SUMMARY

According to an embodiment of the disclosure, a method for retargeting a motion of a hand to a multi-fingered robot hand is provided. The method for retargeting may determine a residual between an optimization-based retargeting method and a labeled configuration of the multi-fingered robot hand using a predefined set of hand-labeled calibration poses. The method for retargeting may use an optimization-based assistive function for active fingers of the multi-fingered robot hand to maintain contact against an object during teleoperation with the multi-fingered robot hand.

According to another embodiment of the disclosure, a method for retargeting a motion of a hand to a multi-fingered robot hand, the method implemented using a computer system including a processor communicatively coupled to a memory device is provided. The method for retargeting may determine a residual between an optimization-based retargeting method and a labeled configuration of the multi-fingered robot hand using a predefined set of hand-labeled calibration poses, wherein a Gaussian Process (GP) residual learning method may be used to determine the residual. The method for retargeting may use an optimization-based assistive function for active fingers of the multi-fingered robot hand to maintain contact against an object during teleoperation with the multi-fingered robot hand, wherein the optimization-based assistive function may allow an operator to constrain any fingertips of the multi-fingered robot hand to stay a specified distance away from a thumb tip of the multi-fingered robot hand.

According to an embodiment of the disclosure, a method for retargeting a motion of a hand to a multi-fingered robot hand is provided. The method for retargeting may determine a residual between an optimization-based retargeting method, which may minimize an error between sensed vectors between points on the hand and scaled vectors between same points on the multi-fingered robot hand, and a labeled configuration of the multi-fingered robot hand using a predefined set of hand-labeled calibration poses. Determining the residual may use a Gaussian Process (GP) residual learning method to determine the residual. The GP residual learning method may collect a number of paired configurations of the multi-fingered robot hand and the hand using the predefined set of hand-labeled calibration poses, $D=\{(q_{hi}, q_{ri})\}_{i\in[c]}$. The GP residual learning method may determine a shared set of fingers between the multi-fingered robot hand and the hand, F. The GP residual learning method may further determine a subset of hand joints, q[f] associated with each of the shared set of fingers $f\in F$. The GP residual learning method may further determine hyperparameters of a multi-output GP to regress the residual between $q_o^*(q_{hi})[f]$ and $q_{ri}$ [f] for each $f\in F$ using D. The method for retargeting may further use an optimization-based assistive function for active fingers of the multi-fingered robot hand to maintain contact against an object during teleoperation with the multi-fingered robot hand, wherein the optimization-based assistive function uses distance constraints among contact points of the multi-fingered robot hand to allow free finger movements in a null space while providing secure contacts against the object in the multi-fingered robot hand.

Figure 1:
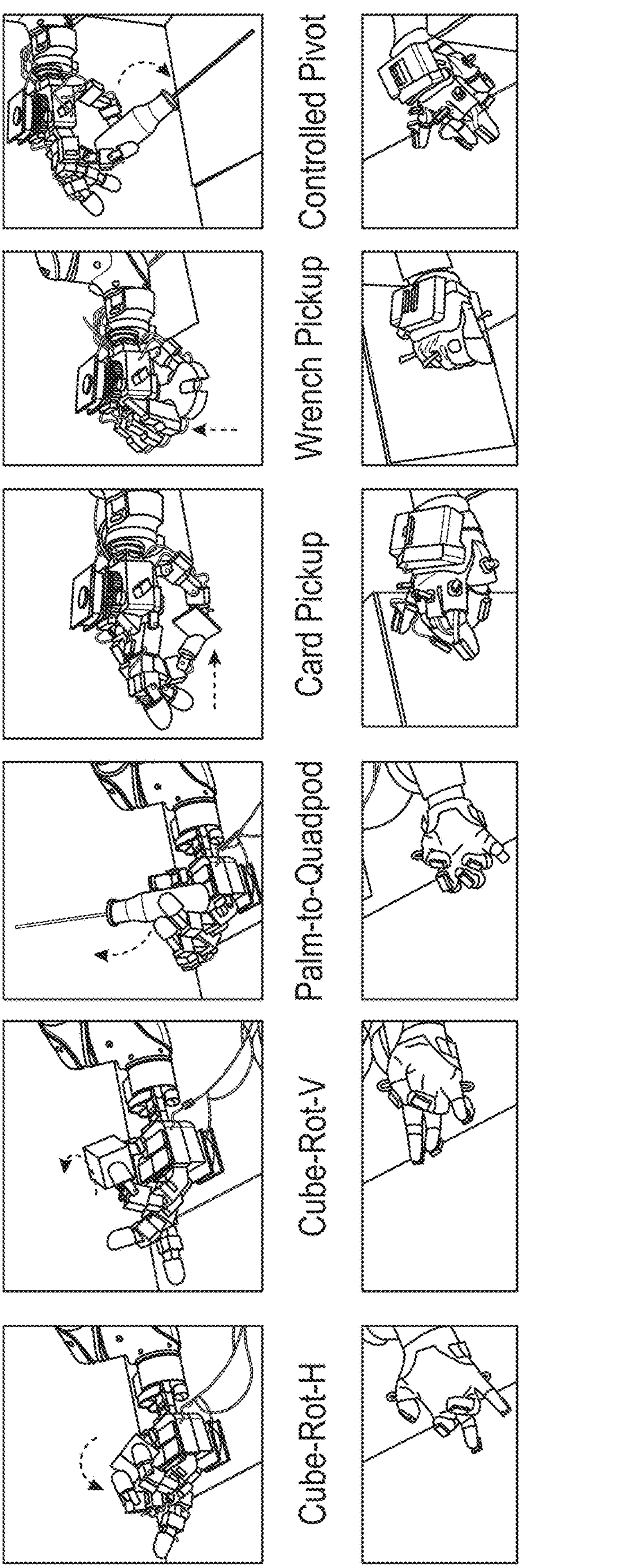
FIG. 1 shows a perspective view of a robot hand performing different finger gating task using an exemplary method for finger gaiting, in accordance with an embodiment of the disclosure.
Figure 2:
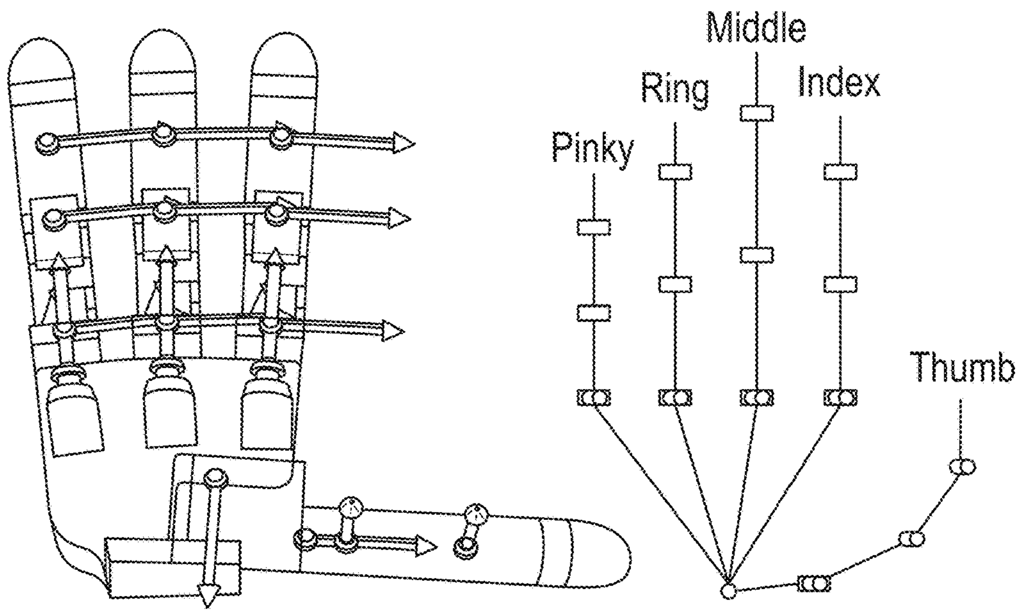
FIG. 2 shows front views of Allegro and human hand kinematics, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The present disclosure provides a novel teleoperation method for finger-gaited dexterous manipulation with multi-fingered robot hands. The present method provides the operator enhanced flexibility in making contacts by expanding the reachable workspace of the robot hand through residual Gaussian Process learning. One may assist the operator in maintaining the prehension of the object with optimization-based constrained motions. Extensive quantitative evaluations may show that the present method effectively enhances the reachable workspace of the robot hand and enables the completion of novel dexterous manipulation tasks that involve finger gaiting.

Reference will now be made in detail to specific aspects or features, examples of which are illustrated in the accompanying drawings. Wherever possible, corresponding, or similar reference numbers will be used throughout the drawings to refer to the same or corresponding parts.

As disclosed above, there may be two sub-issues in finger gaiting teleoperation: 1) making contacts using free fingers at various desired locations on the object and 2) moving fingers that may be in contact with the object without losing the controllability over the object. For 1, the present method may use a small set of hand-labeled calibration poses to learn a residual between an optimization-based retargeting method and the labeled robot configuration. One may use a Gaussian Process to learn this residual. For 2, one may solve an optimization problem with distance constraints among contact points to allow free finger movements in the null space while facilitating stable contacts against the object. To summarize, the present method uses the following approach to solving the two sub-issues:

- A Gaussian Process-based residual learning method that may extend the reachable workspace of the robot hand while remaining intuitive in retargeting and is fast in calibration, training, and inference.
- An optimization-based assistive function for maintaining contacts against the object during teleoperation with multi-fingered robot hands.

With quantitative evaluations and end-to-end task completion trials as may be seen in FIG. 1, one may see that the present method is fast to calibrate, expands the reachable workspace of the robot hand's fingers, and ultimately enables previously unseen teleoperated finger gaiting. In FIG. 1, the present method may have been evaluated on six highly dexterous tasks with the palm facing upward and downward. These tasks may have included: rotating a cube horizontally, rotating a cubed vertically, palm-to-quadpod movement of an object, picking up a card, picking up a wrench, and a controlled pivot of an object.

There may be many existing approaches for retargeting a person's hand motion to an anthropomorphic robot hand. Joint-space retargeters may directly map each joint of the operator's hand to a joint of the robot hand and command the robot joint to have the same angle as the operator's hand joint (or possibly a linear function of the operator's hand joint). While this approach may allow the robot's fingers to approximately match the shape of the operator's, it may make precise fingertip control difficult due to kinematic differences between the robot's and operator's fingers. Conversely, inverse kinematics retargeters, which may use inverse kinematics to directly command each robot fingertip to match the pose of the operator's fingertips relative to their respective palms, may enable precise fingertip grasping, but may result in unintuitive finger shapes. Since robot hands may be substantially larger than the typical human hand, this approach may prevent the operator from reaching much of the robot hand's reachable workspace. In contrast, the present method, by calibrating for important configurations such as precision grasp and hand boundaries, may enable the retargeter to enjoy the advantages of both methods.

Recently, systems have been proposed that may use a hand keypoint-vector matching (HKVM) approach where corresponding keypoints may be labeled on the operator and robot hands (for example, the fingertips and/or palm). A set of pairs of keypoints may then be chosen to define a set of vectors on the robot and operator hands and the desired robot configuration may be computed as the one that minimizes the deviation between these vectors on the robot and operator hands. Typically, a scaling factor may be applied to the vectors on the operator's hand to account for size differences between the hands. While it may have been demonstrated that some basic finger gaiting may have used this method, it is typically used for grasping. The present method incorporates calibration poses to expand the reachable workspace of a base retargeter and solves a simple yet effective constrained optimization problem to enable more complex finger gaiting.

Finally, a few works have proposed "pure-learning" approaches to the retargeting problem where the function from operator hand configuration to robot hand configuration may be directly learned from a set of labeled examples.

While these methods may be similarly capable of both power and precision grasping, it may be difficult to achieve finger gaiting tasks using them. By combining HKVM approaches with learning-based approaches, one may achieve dexterous finger gaiting using a high DoF robot hand with relatively few labeled calibration configurations.

The goal of a retargeting method may be to map a given operator hand configuration to a commanded robot hand configuration. The present method uses a small set of calibration poses to learn a residual between an optimization-based retargeting method and the labeled robot poses conditioned on the operator's hand configuration. The method may assume access to measurements of the operator's fingertip poses and joint angles.

Optimization-Based Retargeting

For a given configuration of the operator's hand, an existing optimization-based method may produce $q_o$* by minimizing the error between the H sensed vectors between keypoints on the operator's hand and the scaled vectors between the same keypoints on the robot hand:

$$q_o^*(q_h) = \underset{q_o}{\operatorname{argmin}} \sum_{i=1}^{H} \|r_i(q_o) - \beta h_i(q_h)\|^2 + \gamma \|q_o\|^2 \tag{1}$$

where $r_i(\cdot)$ and $h_i(\cdot)$ may compute the ith keypoint vector for the robot and human hands respectively, $q_o$ and $q_h$ may denote the robot and human hand configurations respectively, and β is a scaling parameter to account for size differences between the robot and human hands. Y may be a regularization hyperparameter that biases the robot configuration to be close to the zero configuration (corresponding to an open hand). One may use the same 10 keypoint vectors shown in FIG. 3 and set B=1.6, Y=0.0025. One may refer to this retargeter as the "hand keypoint vector matching" (HKVM) retargeter since it may attempt to match vectors between keypoints on the robot's hand to corresponding vectors on the operator's hand.

Residual Gaussian Process

While the HKVM retargeter may accomplish some tasks, it may struggle to reach parts of the fingers' workspace that may be vital for finger gaiting, such as near-palm grasps. To expand the reachable workspace of the present method, one may collect a small number (C) of paired human hand and robot hand configurations, $D=\{(q_{hi}, q_{ri})\}_{i\in[c]}$. F may denote the shared set of fingers between the human and robot hands (in the case of a four-fingered robot hand used here, F={thumb, index, middle, ring}) and denote by q[f] the subset of hand joints associated with finger f∈F. Using D, one may learn the hyperparameters of a multi-output Gaussian Process (GP) to regress the residual between $q_o$*$(q_{hi})$[f] and $q_{ri}$ [f] for each f∈F.

A GP may represent a function g as an indexed set of random variables with the property that any finite subset may have a Gaussian distribution. The GP may be completely specified by its mean and covariance functions μ(x) and k(x, x'):

$$q(x) \sim GP(\mu(x), k(x, x')) \tag{2}$$

-continued $$\begin{bmatrix} g(x_1) \\ \vdots \\ g(x_n) \end{bmatrix} \sim \mathcal{N}(M, K) \tag{3}$$

where $$M = \begin{bmatrix} \mu(x_1) \\ \vdots \\ \mu(x_n) \end{bmatrix}$$

$$K = \begin{bmatrix} k(x_1, x_1) & \ldots & k(x_1, x_n) \\ \vdots & \ddots & \vdots \\ k(x_n, x_1) & \ldots & k(x_n, x_n) \end{bmatrix}$$

If n datapoints $((y_i, x_i))_{i\in[n]}$ have already been observed with additive independent and identically distributed Gaussian noise with variance $\sigma^2$, the conditional distribution of g(x*) at a new input x* may thus be computed as:

$$g(x^*) \sim \mathcal{N}\left(\mu(x^*) + k^T K^{-1}\overline{y}, k(x^*, x^*) - k^T K^{-1} k\right) \tag{4}$$

where $$K = \begin{bmatrix} k(x_1, x_1) & \ldots & k(x_1, x_n) \\ \vdots & \ddots & \vdots \\ k(x_n, x_1) & \ldots & k(x_n, x_n) \end{bmatrix} + \sigma^2 I$$

$$k = [k(x_1, x^*) \ \ldots \ k(x_n, x^*)]^T$$

$$\overline{y} = [y_1 - \mu(x^*) \ \ldots \ y_n - \mu(x^*)]^T.$$

In the present case, the collection of random variables may be the residuals between the base retargeter output $q_o$*$(q_{hi})$ and the labeled robot configuration $q_{ri}$. One may make the simplifying assumptions that the desired residuals of each finger may be independent of each other and that they may be functions of the configuration of the corresponding human finger. These assumptions may make control of each finger more independent and thus easier for the operator to reason about and may reduce the dimensionality of the learning problem. They may enable partial labelling of pairs of hand configurations, as may have been done previously: for example, in fingertip pinching configurations, only the fingers involved in the pinch may be reliably labeled with a corresponding robot configuration. By only using these configurations to train the associated finger models, one may keep the data for each finger model cleaner (less noisy) than if one had to label every finger in every configuration. For a given hand configuration, one may refer to the set of fingers being labeled by that configuration as that configuration's "active fingers."

One may assume a parametric form for k:

$$k(q, q') = \exp\left(-\sum_{i=1}^{|f|} \frac{\arccos\left(V(q_i)V(q_i')^T\right)^2}{2\ell_i^2}\right) \tag{5}$$

where, for a vector of m angles q, V(q) may denote the matrix $$V(q) = \begin{bmatrix} \cos(q_1) & \sin(q_1) \\ \vdots & \vdots \\ \cos(q_m) & \sin(q_m) \end{bmatrix},$$

arccos may be applied element-wise, and L may be a diagonal matrix of tunable length-scales $$L = \frac{1}{2}\begin{bmatrix} \ell_1 & & \\ & \ddots & \\ & & \ell_m \end{bmatrix}^{-2}.$$

One may learn the residual $\xi = V(q_o^*(q_h) - V(q_r)$ to avoid the discontinuities encountered by learning directly in the angle space. Thus, for each finger, one should learn a $2|f|$-dimensional vector-valued function. Rather than learning each component of this function independently, one may learn an additional task-covariance matrix $K_t$, where the element at row i column j may represent the covariance between components i and j of the output. The full covariance matrix may then be computed as $$K_q = K_t \otimes K \tag{6}$$

where $\otimes$ may denote the Kronecker product.

Algorithm 1 may describe how a GP for each finger may be trained. One may use PyTorch and GPyTorch to implement and train the GPs. One may collect a set of calibration configurations, then compute the HKVM target robot configuration for each set of fingertip poses, and save an ordered pair ($\xi[f]$, $q_h[f]$) for each active finger. One may fit a separate GP to each finger's dataset by optimizing the entries of $K_t$ and $\ell_i$ (collected into parameter $\theta$) to maximize the marginal log likelihood of the data:

$$\log(p(Q_r|Q_h,\theta)) = -\frac{1}{2}Q_r^T K_q^{-1} Q_r - \frac{1}{2}\log|K_q| - \frac{n}{2}\log 2\pi. \tag{7}$$

Here, $Q_r$ may be the stacked vector of all C collected residual targets. For each of the C collected calibration points, one may vectorize the $|f|\times 2$ residual matrix and concatenate all C of these vectors to form a $2|f|C$-dimensional vector $Q_r$. Furthermore, in an embodiment, $\theta$ may be updated by using an algorithm for first-order gradient-based optimization of stochastic objective functions, based on adaptive estimates of lower-order moments (e.g., Adam: A Method for Stochastic Optimization).

| Algorithm 1 Training the GP |
| --- |
| 1: function TRAINGP(D, $\alpha$, E, f) |
| 2: Initialize $\theta$ randomly |
| 3: Vectorize the sequence of $\xi[f]$ in D into $Q_r$ |
| 4: Vectorize the sequence of $V(q_h)$ in D into $Q_h$ |
| 5: for $e \in [E]$ do |
| 6: Compute K for all pairs of ($q_h$, $q_h$') $\in$ D using Equation 5 and the current values of $\ell$ |
| 7: $K_q \leftarrow K_t \otimes K$ using the current value of $K_t$ |
| 8: Compute loss L from Equation 7 |
| 9: Compute $\nabla_\theta L$ and update $\theta$ with learning rate $\alpha$ |
| 10: return $\theta$ |

When using the retargeter, one may first compute $q_o^*$ using Equation 1 above. Then, for each finger, one may find the posterior mean $\xi^*$ of the residual distribution at the current finger joint configuration conditioned on the collected calibration poses for the current user, using Equation 4 above. For each finger, one may compute desired joint angles by converting the $|f|\times 2$ matrix $V(q_o^*[f])+\xi^*$ into a $|f|$-dimensional vector, finding the angle each row may make with the x-axis. One may then collect each of these finger joint targets into $q_d$, the full desired configuration of the hand.

Finger Constraints

Using the combination of optimization and learning techniques outlined above, one may achieve an effective retargeter from a human to robot hand that may allow the operator to command the robot to many points in its workspace. This may allow them to establish contact on many different possible points of a target object. However, stably maintaining this contact while moving the object in the robot's fingers may still be difficult because the operator may not be able to perfectly visualize the robot's target configuration, or reason about the forces that may apply to the target object. To alleviate this issue, one may allow the operator to apply constraints on the motions of fingers to couple them together. The present system and method may allow the operator to constrain any of the robot's fingertips to stay a hand-specified distance $\delta$ away from the robot's thumb tip. One may compute the final constrained robot configuration by solving $$q_c = \underset{q}{\operatorname{argmin}} \|q - q_d\|_2^2 \tag{8}$$

$$\text{s.t. } \|r_i(q)\| = \delta \ \forall\, i \in R_c \tag{9}$$

where $R_c$ may denote the set of constrained fingertip vectors. $R_c$ may contain the indices of vectors between one of the robot's fingertips and its thumb. One may allow the operator to toggle each of the index, middle, and ring-to-thumb vectors inclusion in $R_c$ by tapping a corresponding foot pedal.

Full Method

Algorithm 2 below may show how the final desired joint configuration may be computed. To solve the mathematical programs on Lines 3 and 8 one may use the NLopt library with the SLSQP algorithm. One may use the PyTorch Kinematics library to compute and differentiate through the forward kinematics function of the robot hand.

| Algorithm 2 Full computation of the desired joint angles |
| --- |
| 1: function COMPUTEDESIREDQ($q_h$, D, $\theta$, $\beta$, $\gamma$, $R_c$) |
| 2: Update $R_c$ from user input (pedal presses) |
| 3: Compute $q_o^*$ from Equation 1 |
| 4: Allocate $q_d$ |
| 5: for $f \in F$ do |
| 6: Compute $\xi^*[f]$ using Equation 4 |
| 7: $q_d[f] \leftarrow a(\xi^*[f] + V(q_o^*))$ |
| 8: Compute $q_c$ from Equation 8 |
| 9: return$q_c$ |

After the desired joint configuration is computed, it may be sent to a lower level (gravity compensated) PD torque controller that tracks this set point (smoothed by an exponential filter). This controller may allow the operator to control the force each finger exerts on a grasped object by moving the set point for that finger into or out of the object.

Calibration Poses

Figure 4:
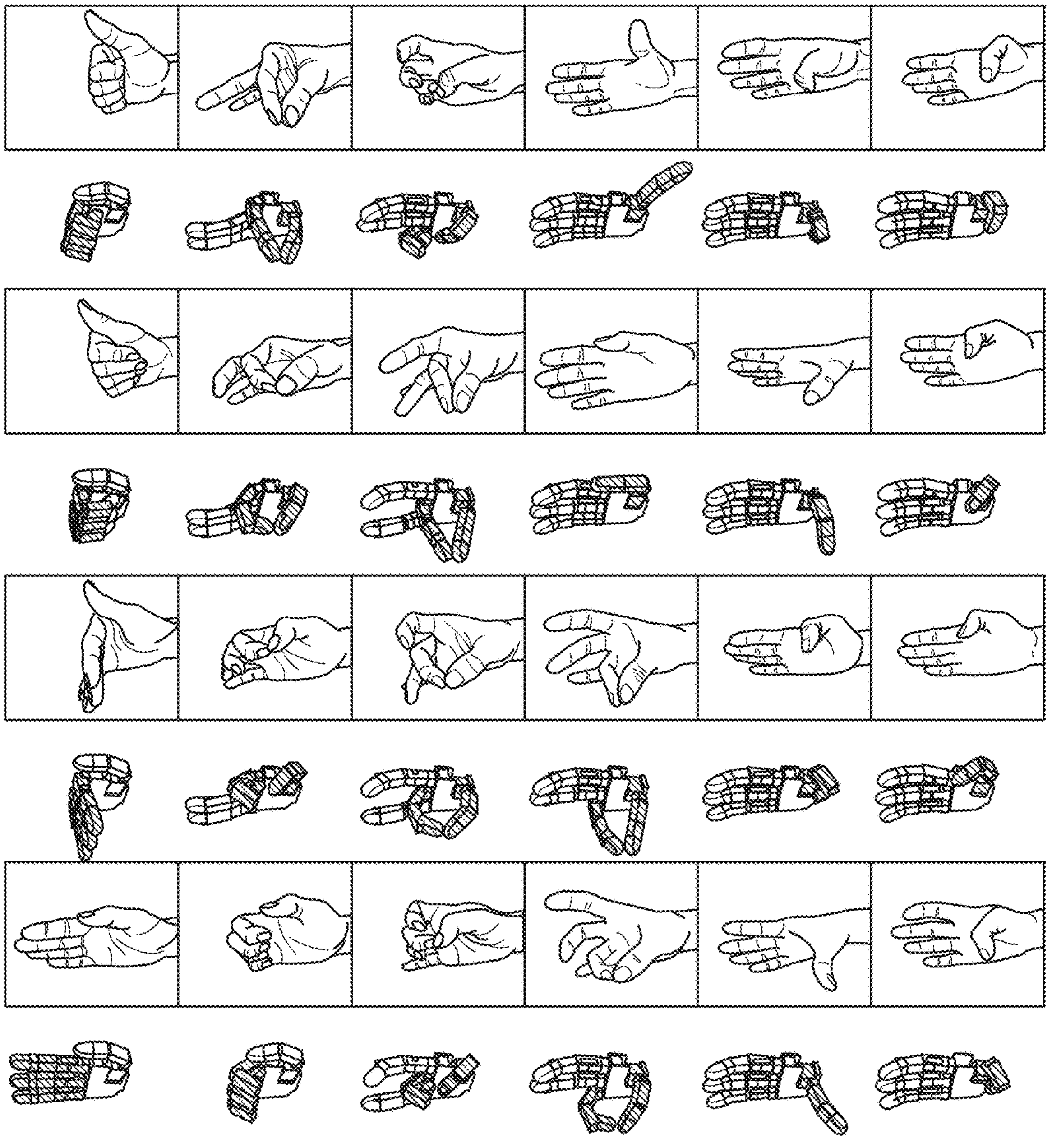
FIG. 4 shows front views of hand poses, and corresponding robot hand poses for 24 calibration poses for learning the exemplary method for finger gaiting, in accordance with an embodiment of the disclosure.

One may choose calibration poses to 1) further expand the workspace of the base retargeter and 2) correct the retargeting results on important configurations, e.g., pinching. With user experience in mind, one may collect a small set of calibration poses based on the following heuristics: first, in a retargeting system, the reachable workspace of the follower hand may be limited by that of the leader hand. One may reduce the effect of this limitation by mapping joint-or contact-limiting configurations of the human hand to the corresponding robot configurations also at its limits. Moreover, one may hypothesize that the workspace may be expanded by a few key calibration poses such as pinching, adduction/abduction, and fully stretching the fingers. Finally, one may reduce the number of calibration poses by constraining the choice of configurations within a volume of interest around the palm. The final calibration poses that one may use for experiments may be summarized in FIG. 4, in which one may include a few halfway poses between extremities (collected right after boundary poses in practice for a better consistency). The set of calibration poses may be straightforwardly customized to fit different key pose choices and other robot hands. In FIG. 4, a set of 24 calibration poses used to learn the residual GP may be shown. Active fingers for each calibration configuration may be shown in hatched lines.

Data Collection Procedures

One may first collect a set of robot configurations according to the previously defined calibration poses by manually backdriving the robot hand and recording its joint angles. For each configuration, one may additionally record which fingers are "active," that is, which finger joints may be actually saved from the configuration. One may choose these based on which fingers the operator may reliably imitate. One may record images of an operator's hand corresponding to each robot configuration. To collect calibration data for a new operator, one may ask the operator to imitate the hand pose shown in these images, rather than the raw robot configuration, since this may be more intuitive for non-expert users. For each calibration configuration, the operator's fingertip poses and hand joint angles may be recorded.

Robot and Tasks

One may use an Allegro right hand as the robot hand and use a Manus Quantum Metaglove to track the operator's right hand fingertip poses and joint angles. One may test the present method through real-world tasks including finger gaiting tasks previously unseen in teleoperation literature, and a few common tasks to show that the present method preserves such capabilities, the details which may be shown below.

Experimental Results

To evaluate the present retargeter, one may calibrate it to two different operators and measured their ability to complete 6 different tasks requiring substantial dexterity from the robot's fingers, including several finger gaiting tasks. Calibration takes approximately 3 minutes (including training the GP), making it relatively easy to calibrate the retargeter to each operator individually.

End-to-End Testing

Figure 5:
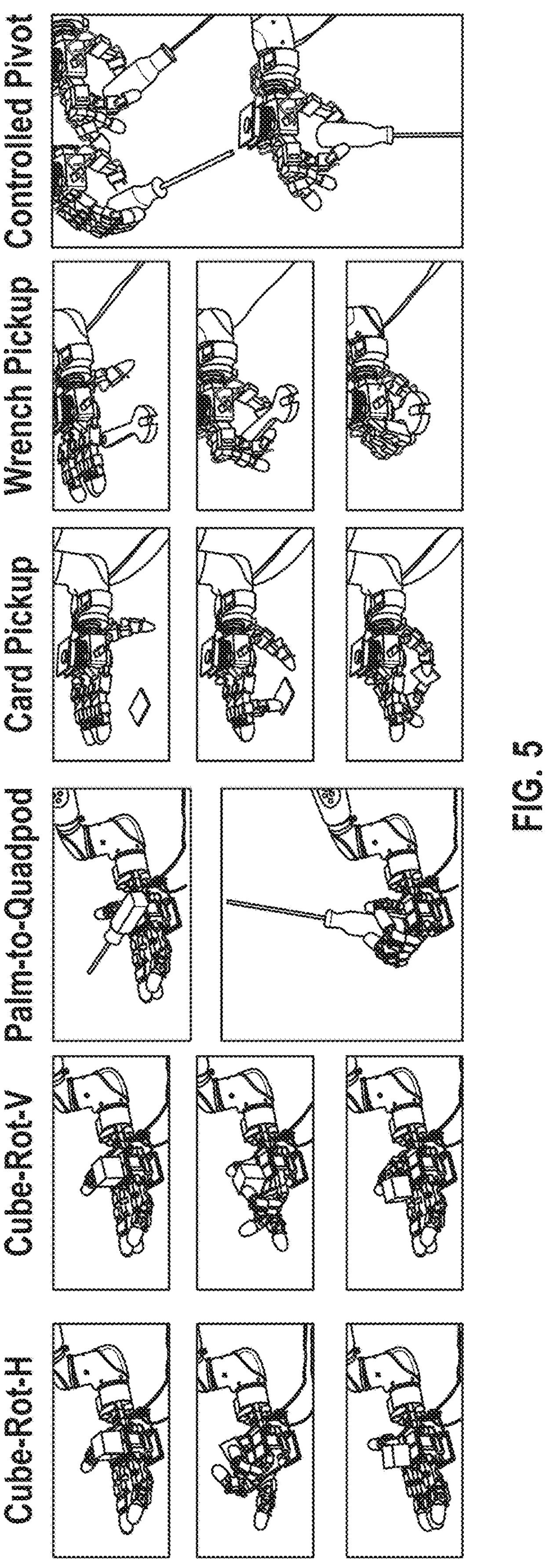
FIG. 5 shows side perspective views of different task performed by the robot hand using the exemplary method for finger gaiting, in accordance with an embodiment of the disclosure.

One may evaluate the present system on the 6 challenging tasks shown in FIG. 5 and summarized below:

1. Horizontal Cube Rotation (Rot H): The operator may lift the cube off of the robot's palm and rotate it 180° about the horizontal axis before placing it back on the palm.
2. Vertical Cube Rotation (Rot V): Similar to Rot H but the operator may rotate the cube 90° about the vertical axis.
3. Screwdriver Palm to Quadpod (P-to-Q): The operator may start with a screwdriver resting against the palm and should transition it into a "quadpod" grasp (suitable for turning the screwdriver about its axis).
4. Wrench Pickup (Wrench): The operator may pick up a wrench off of a table by first pinching it, lifting it up, then transitioning to power grasping it.
5. Card Pickup (Card): The operator may pick up a card off of a table by sliding it over the edge and pinching it between two fingers.
6. Screwdriver Controlled Pivot (Pivot): The operator may start by fingertip grasping a screwdriver with all four fingers then releases the index and ring fingers before loosening the remaining grip between the middle finger and thumb until the screwdriver rotates to point downwards. This task may require precise control of the grasping force to allow the screwdriver to pivot without falling out of the hand.

Compared to previous dexterous manipulation systems, one may demonstrate the present retargeter without any arm motion so that all dexterity may come from finger-level manipulation. The retargeter may be kept the same across all tasks and attempts: no hand-tuning may be performed for individual tasks.

Figure 6A:
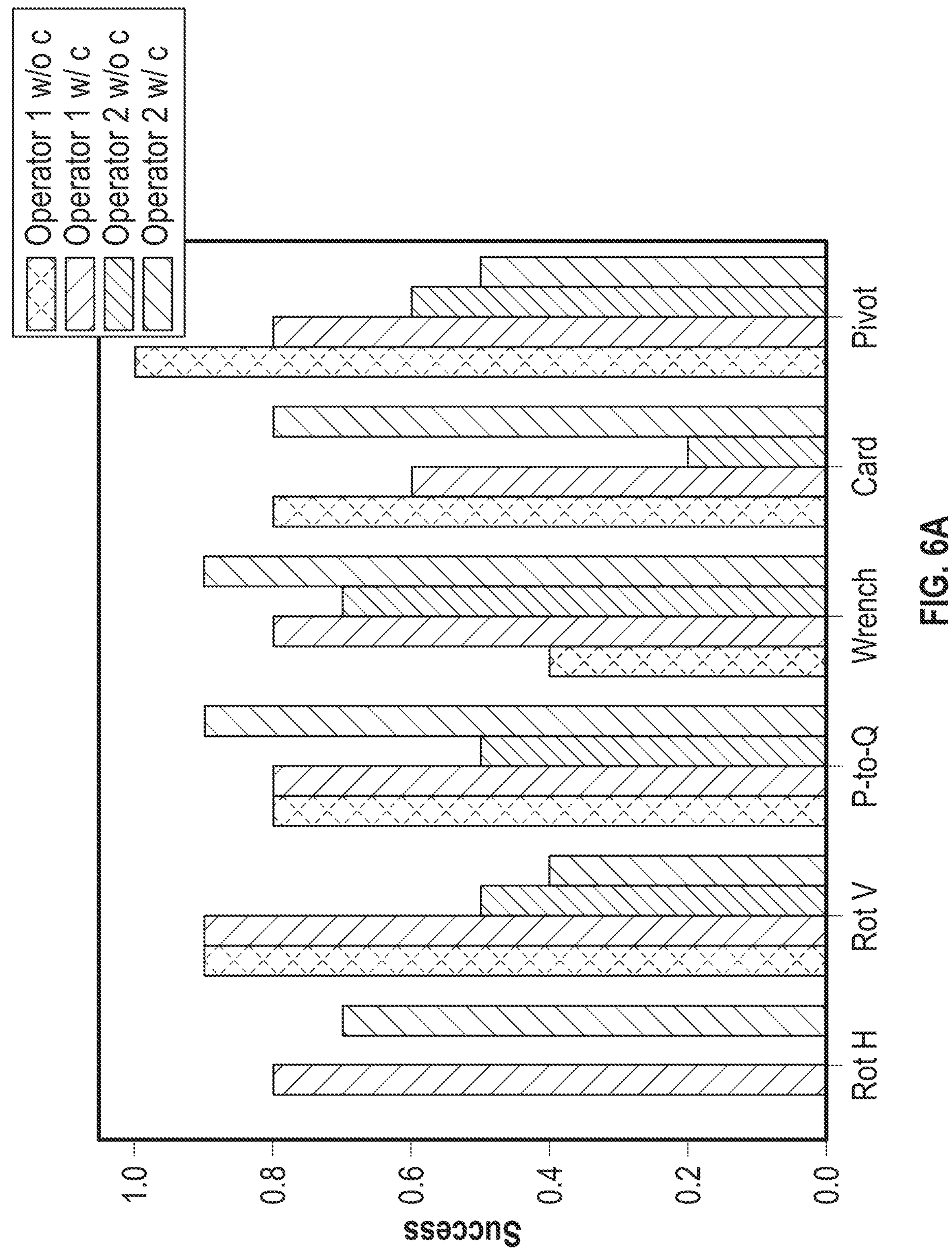
FIGS. 6A-6B show charts comparing different task performed by the robot hand using the exemplary method for finger gaiting, in accordance with an embodiment of the disclosure.
Figure 6B:
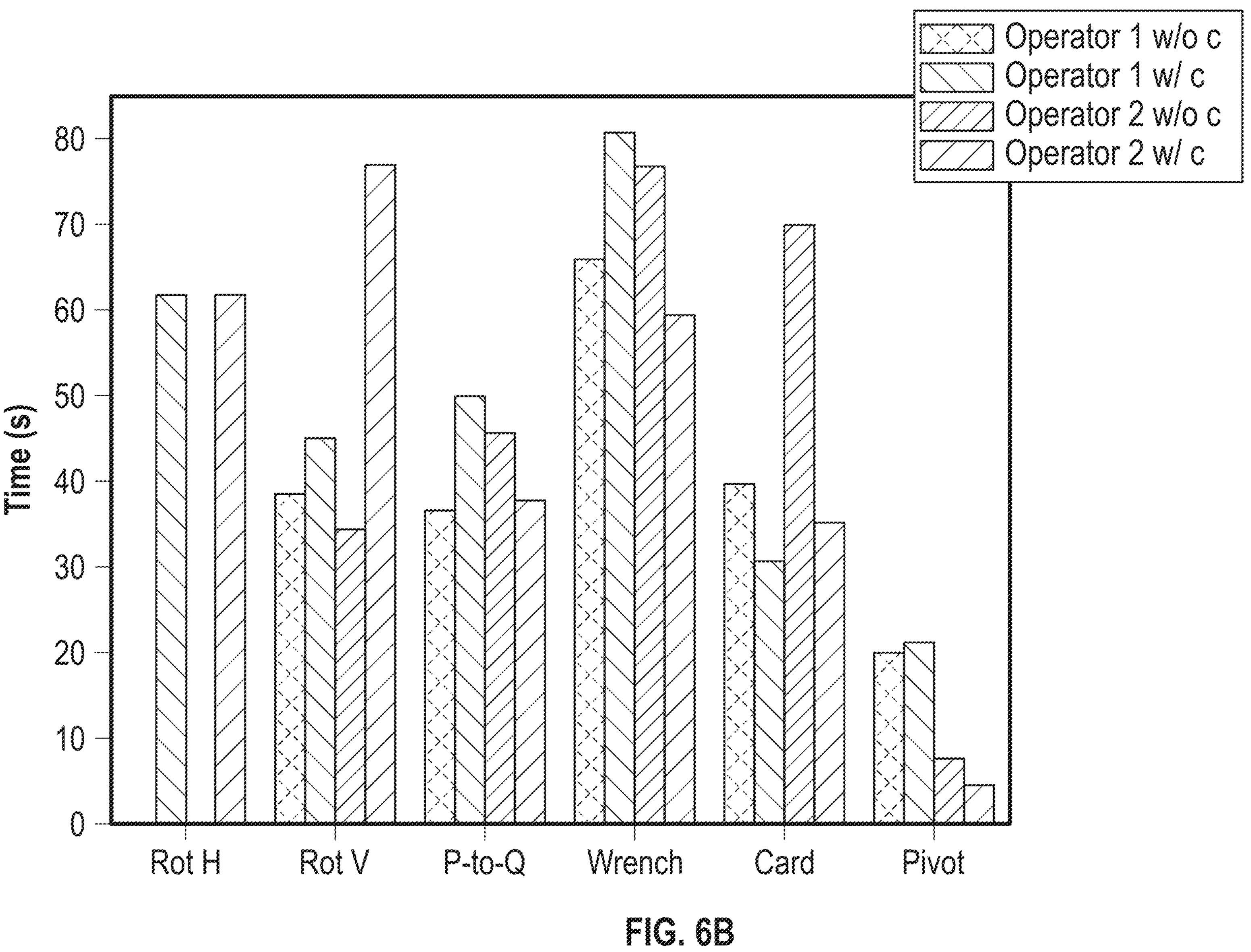

In accordance with one evaluation, two operators attempt to complete all 6 tasks 5 times in a row, both with and without the use of the finger constraints as disclosed above. Operators may have been allowed to attempt the tasks several times before starting their five scored runs to get accustomed to the precise movement of the retargeter. In cases where the operator could use the finger constraints, they may have been required to try to use them at least once. For each attempt, the operator earned 1 point for successful completion of the task, 0.5 points for reaching the desired final state but violating a task constraint (e.g., introducing rotation about unwanted axes during Rot H or Rot V, failing to control the screwdriver's pivoting in Pivot), and 0 points otherwise. In addition, one may compute the average of each operator's completion times for attempts where they scored any points. FIGS. 6A-6B summarize the task performed by the two operators on the 6 task both with and without using the fingertip constraints. The graphs of FIGS. 6A-6B may show the average scores and times achieved by each operator under each condition. The graph shown in FIG. 6A may show the scores earned by each operator while the graph shown in FIG. 6B may show their average times taken on their successful attempts.

Both operators were able to complete several tasks with relatively high reliability considering their difficulty. Interestingly, the benefit of using finger constraints may vary significantly between different tasks. Constraints may be most effective in the Rot H, P-to-Q, Wrench, and Card tasks, where the operator may need to hold the target object steady as they use other fingers to adjust its pose, or may use precise finger control to grasp a very thin object. By approximately tracking the operator's raw joint set point while keeping the desired fingers snapped together, the constraint may allow the operator to maintain stable contact with the target object even while translating it or touching it with other fingers. It may be noted that Operator 1's performance on the Card task is lower when using constraints due to them accidentally flicking the card off of the table, a problem unrelated to the constraints themselves. However, in the Rot V and Pivot Tasks, the use of constraints may sometimes reduce the operator's performance. In the case of the Pivot task, they simply serve as a distraction, since once a constraint is activated, the operator may have no way to control the force being applied between the finger and thumb. In the Rot V task, one may observe that once the constraint was activated, it may be difficult to rotate the object about the desired axis.

Both operators were able to perform the tasks in a reasonable amount of time, often in less than a minute.

Comparison With Previous Methods

One may hypothesize that the present retargeter's ability to complete these difficult tasks may stem from its ability to reach many parts of the robot hand's workspace while still preserving precise operation in regions that may require it (for example, when pinching the fingers). To evaluate this, one may collect a long trajectory of N human hand joint angles by having the operator attempt to move through all regions of their hand's workspace. One may use this approach to approximate the operator's hand workspace, rather than sampling on a kinematic model of the operator's hand, to capture subtleties such as configuration-dependent joint limits of human fingers. One may use several different retargeters to compute a set of corresponding robot joint trajectories $(q^j_{ri})_{i \in [N]}$ where j may denote which retargeter may have been used. One may use Algorithm 3 to approximate the reachable workspace of the retargeter, considering each finger independently and discretizing the robot's joint space into hypercubes of size δ. $|f|$ may denote the number of joints associated with the robot finger f (in the case of the Allegro hand, always equal to 4). One may sum the workspace of each finger to arrive at the retargeter's total reachable workspace. To compute the workspace of the robot's fingertips under each retargeter, one may similarly run Algorithm 3 but replace Line 6 with $X \leftarrow X\ U \cup \lfloor p\ (q_{ri}\ [f])/\delta \rfloor$ and Line 7 with $w \leftarrow w + |X| \delta^3$. Here, $p(\cdot)$ may get the position of the relevant robot fingertip in its palm frame.

Algorithm 3 Compute joint workspace

```
1:      function COMPUTEJOINTWORKSPACE((q_ri)_i∈[N], δ)
2:         w ← 0
3:         for f ∈ F do
4:            X ← Ø
5:            for i ∈ [N] do
6:               X ← X ∪ ⌊q_ri [f]/δ⌋▷ ⌊·⌋ and division applied elementwise
7:            w ← w + |X|δ^|f|
8:            return
w
```

Figure 3:
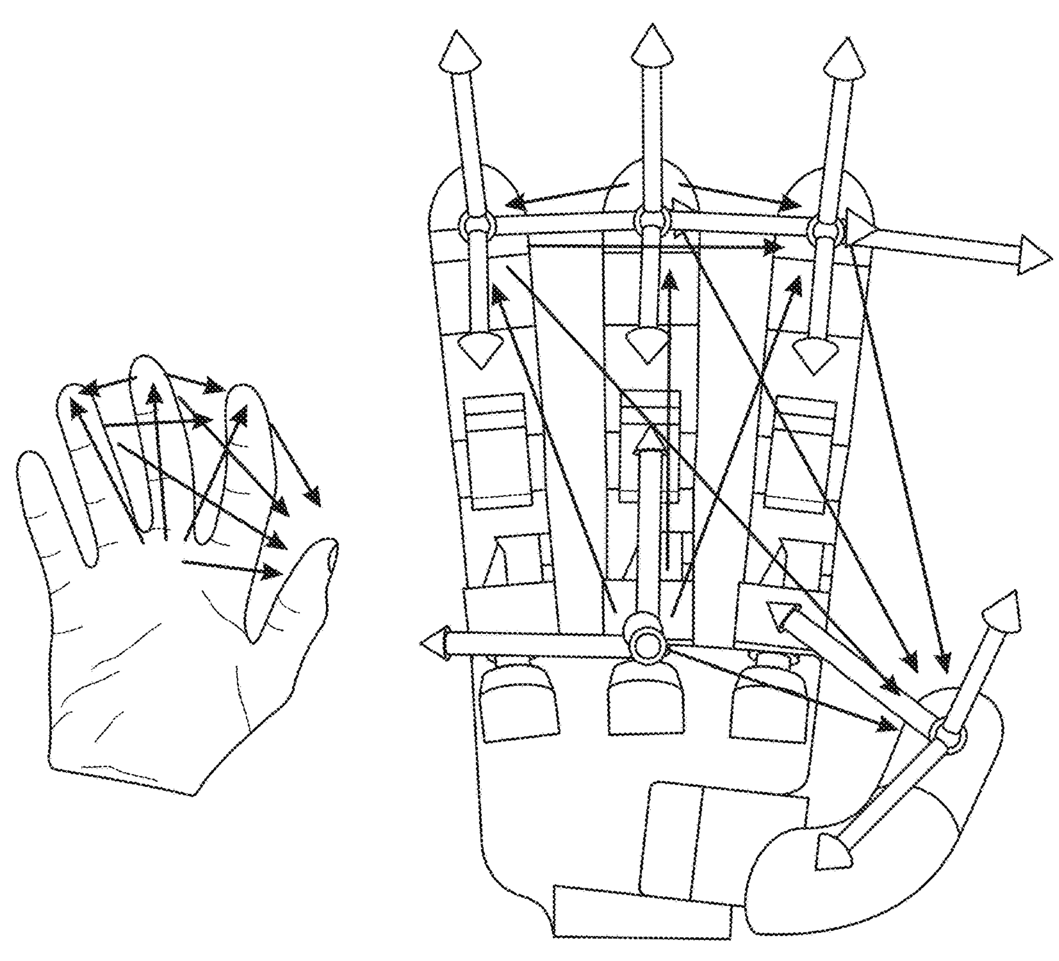
FIG. 3 shows front views of hand keypoint vectors for a hand and a robot hand using an exemplary method for finger gaiting, in accordance with an embodiment of the disclosure.

One may test several existing retargeters and evaluate their reachable workspace:

- Joint Space (Joint): Since the kinematic model of the human and robot hands may have the same number of joints (excluding the human's pinky), one may simply remap each human joint to the corresponding robot joint (ordered by proximity to the palm). For each human joint, one may find its limits (from the recorded workspace) and linearly rescale its range to match the robot's joint range. To run the retargeter, one may apply these scalings to each of the human's current joint values to find the desired robot joint configuration.
- Inverse Kinematics (IK): One may track each of the human's fingertips in their palm frame and solve an IK problem for each of the robot's fingers to place the corresponding fingertip at that position. The palm frames may be placed as shown in FIG. 3.
- Hand Keypoint Vector Matching (HKVM): One may directly use $q_o^*$ (from Equation 1) as the desired joint configuration.
- Dexpilot (Dexpilot): May be essentially the same method as HKVM but using the heuristics presented in previous methods for precise fingertip pinching and collision avoidance (e.g., DexPilot: Vision-Based Teleoperation of Dexterous Robotic Hand-Arm System).
- Gaussian Process (GP): One may directly train a GP on the calibration data to output the target joint configuration. One may use a constant mean function and the same kernel and rotation representation presented here.
- Neural Network (NN): May be the same as GP but using a neural network.
- Residual Neural Network (Res-NN): May use a neural network to learn a residual on top of HKVM.
- Residual Gaussian Process (Res-GP): The current method presented here.

As shown in Table 1, the Res-GP retargeter of the present method may achieve by far the highest joint and fingertip workspace of any retargeter. In fact, Res-GP may achieve a higher workspace than the Joint retargeter, which may be constructed to be able to reach the full range of each robot joint. This may likely be due to the configuration-dependent joint limits and correlated movements of human fingers. The fingertip retargeting methods (IK, HKVM, and Dexpilot) may be mostly concerned with configurations in the vicinity of fingertip grasps. These methods may tend to severely limit the thumb's mobility near the base of the palm. Finally, other learning-based methods (GP, NN, and Res-NN) may tend to essentially overfit, often "snapping" quickly between calibration poses rather than smoothly interpolating between them. Res-GP in contrast, may use a strong prior of how to interpolate between fingertip configurations (encoded both by HKVM as a base retargeter and ones choice of kernel parameterization), allowing it to both reach the far extents of the workspace (specified by the calibration poses) while allowing for smooth control in its interior. This higher workspace may allow Res-GP to reach many parts of target objects, giving the operator many choices of contact location, and ultimately enabling advanced finger gaiting.

TABLE 1

Reachable workspaces of each of the retargeters.

| Method | Joint Workspace ($rad^4$) | Fingertip Workspace ($cm^3$) |
|---|---|---|
| Joint | 0.1196 | 912.275 |
| IK | 0.1198 | 462.625 |
| HKVM | 0.2028 | 1090.750 |
| DexPilot [7] | 0.1577 | 908.950 |
| NN | 0.0627 | 500.325 |
| GP | 0.0718 | 706.600 |
| Res-NN | 0.1749 | 1170.450 |
| Res-GP (Ours) | 0.2399 | 1511.050 |

Figure 7:
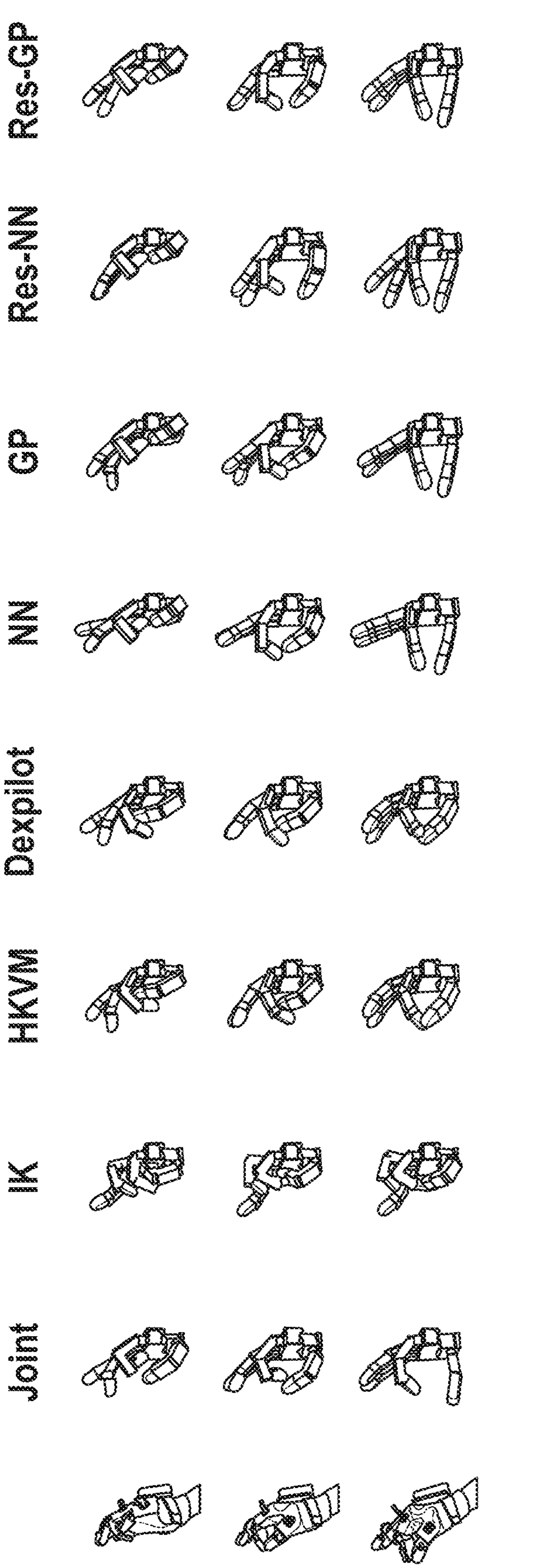
FIG. 7 show charts comparing different task performed by the robot hand using the exemplary method for finger gaiting and other methods, in accordance with an embodiment of the disclosure.

In addition, while Res-GP may expand the workspace of the robot's hand, it still may allow the operator to precisely control the fingers in critical regions, such as fingertip pinches. FIG. 7 may show several human hand poses and the corresponding robot poses commanded by each of the retargeters. The Joint retargeter may do a poor job of approximating this pinch configuration, and while the IK, HKVM, and Dexpilot retargeters may be able to well approximate the pinch, the location of the pinch may remain relatively static relative to the palm. In contrast, the Res-GP retargeter may be able to pinch both near and far from the palm. This show how Res-GP may effectively capture where it may trade off sensitivity for reachability.

The present disclosure may present a teleoperation method for finger-gaited dexterous manipulation with multi-fingered robot hands. The present method may learn a residual GP on a small set of calibration poses and provide constrained motions for operator assistance. Based on real-world experiments, the present method may be fast in calibration, training, and inference (around 10 Hz). Quantitatively, the present method may improve over previous works in the reachable workspace. Qualitatively, the present method may enable the successful completion of previously unseen finger gaiting tasks on teleoperated robot hands, paving the way for future applications and data generation for autonomous dexterity.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not to be limited to the particular embodiment disclosed, but that the present disclosure will include all embodiments that fall within the scope of the appended claims.

The invention claimed is:

1. A method for retargeting a motion of a hand to a multi-fingered robot hand comprising:

determining a residual between an optimization-based retargeting method and a labeled configuration of the multi-fingered robot hand using a predefined set of hand-labeled calibration poses; and using an optimization-based assistive function for active fingers of the multi-fingered robot hand to maintain contact against an object during teleoperation with the multi-fingered robot hand.

2. The method for retargeting of claim 1, wherein determining a residual comprises using a Gaussian Process (GP) residual learning method to determine the residual.

3. The method for retargeting of claim 1, wherein the optimization-based retargeting method comprises minimizing an error between sensed vectors between points on the hand and scaled vectors between same points on the multi-fingered robot hand.

4. The method for retargeting of claim 1, wherein the optimization-based retargeting method comprises minimizing an error between H sensed vectors between points on the hand and scaled vectors between same points on the multi-fingered robot hand using an equation:

$$q_o^*(q_h) = \underset{q_o}{\operatorname{argmin}} \sum_{i=1}^{H} \|r_i(q_o) - \beta h_i(q_h)\|^2 + \gamma \|q_o\|^2$$

where $r_i(\cdot)$ and $h_i(\cdot)$ compute an ith point vector for the multi-fingered robot and the hand respectively, $q_o$ and $q_h$ denote configurations of the multi-fingered robot and the hand of the operator respectively, β is a scaling parameter to account for size differences between the multi-fingered robot and the hand and Y is a regularization hyperparameter that biases a configuration of the multi-fingered robot to be correspond to an open hand.

5. The method for retargeting of claim 2, wherein using a Gaussian Process (GP) residual learning method comprises:

collecting a number of paired configurations of the multi-fingered robot hand and the hand using the predefined set of hand-labeled calibration poses, $D=\{(q_{hi}, q_{ri})\}_{i\in[c]}$;

determining a shared set of fingers between the multi-fingered robot hand and the hand, F;

determining a subset of hand joints, q[f] associated with each of the shared set of fingers $f\in F$; and determining hyperparameters of a multi-output Gaussian Process (GP) to regress the residual between $q_o^*(q_{hi})[f]$ and $q_{ri}$ [f] for each $f\in F$ using D.

6. The method for retargeting of claim 5, wherein residuals of each finger of the multi-fingered robot hand is independent of one another and are functions of a corresponding finger of the hand enabling labeling of pairs of the predefined set of hand-labeled calibration poses.

7. The method for retargeting of claim 5, wherein residuals of each finger of the multi-fingered robot hand are independent of one another and are functions of a corresponding finger of the hand enabling forming pairs of the predefined set of hand-labeled calibration poses, wherein the pairs of the predefined set of hand-labeled calibration poses are used to train the multi-finger robot hand.

8. The method for retargeting of claim 2, comprising training the GP for each finger of the multi-finger robot hand.

9. The method for retargeting of claim 8, wherein training the GP comprises:

collecting a set of calibration configurations from the predefined set of hand-labeled calibration poses;

computing a hand keypoint vector matching (HKVM) target robot configuration for each set of fingertip poses of the multi-finger robot hand;

saving an ordered pair for each active finger of the multi-finger robot hand;

fitting a separate GP to each dataset of the active fingers of the multi-finger robot hand by optimizing entries of a covariance matrix to maximize a marginal log likelihood of data.

10. The method for retargeting of claim 1, wherein the optimization-based assistive function allows an operator to constrain any fingertips of the multi-fingered robot hand to stay a specified distance away from a thumb tip of the multi-fingered robot hand.

11. The method for retargeting of claim 1, wherein the optimization-based assistive function uses distance constraints among contact points of the multi-fingered robot hand to allow free finger movements in a null space while providing secure contacts against the object in the multi-fingered robot hand.

12. The method for retargeting of claim 11, comprising computing a final constrained multi-fingered robot hand configuration by forming a set of constrained fingertip vectors by toggling each of index, middle, and ring-to-thumb vectors.

13. A method for retargeting a motion of a hand to a multi-fingered robot hand, the method implemented using a control system including a processor communicatively coupled to a memory device, the method comprising:

determining a residual between an optimization-based retargeting method and a labeled configuration of the multi-fingered robot hand using a predefined set of hand-labeled calibration poses, wherein a Gaussian Process (GP) residual learning method is used to determine the residual; and using an optimization-based assistive function for active fingers of the multi-fingered robot hand to maintain contact against an object during teleoperation with the multi-fingered robot hand, wherein the optimization-based assistive function allows an operator to constrain any fingertips of the multi-fingered robot hand to stay a specified distance away from a thumb tip of the multi-fingered robot hand.

14. The method for retargeting of claim 13, wherein the optimization-based retargeting method comprises minimizing an error between sensed vectors between points on the hand and scaled vectors between same points on the multi-fingered robot hand.

15. The method for retargeting of claim 13, wherein the optimization-based retargeting method comprises minimizing an error between H sensed vectors between points on the hand and scaled vectors between same points on the multi-fingered robot hand using an equation:

$$q_o^*(q_h) = \underset{q_o}{\operatorname{argmin}} \sum_{i=1}^{H} \|r_i(q_o) - \beta h_i(q_h)\|^2 + \gamma \|q_o\|^2$$

where $r_i(\cdot)$ and $h_i(\cdot)$ compute an ith point vector for the multi-fingered robot and the hand respectively, $q_o$ and $q_h$ denote configurations of the multi-fingered robot and the hand of the operator respectively, β is a scaling parameter to account for size differences between the multi-fingered robot and the hand and Y is a regularization hyperparameter that biases a configuration of the multi-fingered robot to be correspond to an open hand.

16. The method for retargeting of claim 13, wherein using a Gaussian Process (GP) residual learning method comprises:

collecting a number of paired configurations of the multi-fingered robot hand and the hand using the predefined set of hand-labeled calibration poses, $D=\{(q_{hi}, q_{ri})\}_{i \in [c]}$;

determining a shared set of fingers between the multi-fingered robot hand and the hand, F;

determining a subset of hand joints, q[f] associated with each of the shared set of fingers $f \in F$; and determining hyperparameters of a multi-output Gaussian Process (GP) to regress the residual between $q_o^*(q_{hi})[f]$ and $q_i$ [f] for each $f \in F$ using D.

17. The method for retargeting of claim 16, wherein residuals of each finger of the multi-fingered robot hand are independent of one another and are functions of a corresponding finger of the hand enabling forming pairs of the predefined set of hand-labeled calibration poses, wherein the pairs of the predefined set of hand-labeled calibration poses are used to train the multi-finger robot hand.

18. The method for retargeting of claim 16, comprising training the GP for each finger of the multi-finger robot hand, wherein training the GP comprises:

collecting a set of calibration configurations from the predefined set of hand-labeled calibration poses;

computing a hand keypoint vector matching (HKVM) target robot configuration for each set of fingertip poses of the multi-finger robot hand;

saving an ordered pair for each active finger of the multi-finger robot hand;

fitting a separate GP to each dataset of the active fingers of the multi-finger robot hand by optimizing entries of a covariance matrix to maximize a marginal log likelihood of data.

19. The method for retargeting of claim 13, wherein the optimization-based assistive function uses distance constraints among contact points of the multi-fingered robot hand to allow free finger movements in a null space while providing secure contacts against the object in the multi-fingered robot hand.

20. A method for retargeting a motion of a hand to a multi-fingered robot hand comprising:

determining a residual between an optimization-based retargeting method, which minimizing an error between sensed vectors between points on the hand and scaled vectors between same points on the multi-fingered robot hand, and a labeled configuration of the multi-fingered robot hand using a predefined set of hand-labeled calibration poses, wherein determining a residual comprises using a Gaussian Process (GP) residual learning method to determine the residual, wherein using a Gaussian Process (GP) residual learning method comprises:

collecting a number of paired configurations of the multi-fingered robot hand and the hand using the predefined set of hand-labeled calibration poses, $D=\{(q_{hi}, q_{ri})\}_{i \in [c]}$;

determining a shared set of fingers between the multi-fingered robot hand and the hand, F;

determining a subset of hand joints, q[f] associated with each of the shared set of fingers $f \in F$; and determining hyperparameters of a multi-output Gaussian Process (GP) to regress the residual between $q_o^*(q_{hi})[f]$ and $q_i$ [f] for each $f \in F$ using D; and using an optimization-based assistive function for active fingers of the multi-fingered robot hand to maintain contact against an object during teleoperation with the multi-fingered robot hand, wherein the optimization-based assistive function uses distance constraints among contact points of the multi-fingered robot hand to allow free finger movements in a null space while providing secure contacts against the object in the multi-fingered robot hand.

* * * * *